US005473028A

United States Patent [19]

Nowlin et al.

[11] Patent Number: 5,473,028
[45] Date of Patent: Dec. 5, 1995

[54] PROCESS AND A CATALYST FOR PREVENTING REACTOR FOULING

[75] Inventors: Thomas E. Nowlin, West Windsor; Frederick Y. Lo; Ronald S. Shinomoto, both of Edison; Pradeep P. Shirodkar, Somerset, all of N.J.

[73] Assignee: Mobil Oil Corporation, Fairfax, Va.

[21] Appl. No.: 229,516

[22] Filed: Apr. 19, 1994

Related U.S. Application Data

[62] Division of Ser. No. 997,421, Dec. 28, 1992, Pat. No. 5,332,706.

[51] Int. Cl.⁶ .................... C08F 2/34; C08F 4/64
[52] U.S. Cl. .................. 526/114; 526/88; 526/113; 526/119; 526/129; 526/153; 526/160; 526/348.5; 526/901; 502/120; 502/152
[58] Field of Search .................. 526/88, 113, 114, 526/119, 129, 153, 160, 348.5, 901

[56] References Cited

U.S. PATENT DOCUMENTS

| | | | |
|---|---|---|---|
| 3,135,809 | 6/1964 | Bosmajian | 260/650 |
| 3,950,269 | 4/1976 | Setterquist | 252/430 |
| 4,188,470 | 2/1980 | Collina et al. | 526/64 |
| 4,299,936 | 11/1981 | Candlin et al. | 526/119 |
| 4,324,691 | 4/1982 | Hartshorn et al. | 252/429 B |
| 4,338,424 | 7/1982 | Morita et al. | 526/65 |
| 4,404,344 | 9/1983 | Sinn et al. | 526/160 |
| 4,414,369 | 11/1983 | Kuroda et al. | 526/65 |
| 4,420,592 | 12/1983 | Kato et al. | 526/65 |
| 4,525,550 | 6/1985 | Warzelhan et al. | 526/116 |
| 4,530,914 | 7/1985 | Ewen et al. | 502/113 |
| 4,536,484 | 8/1985 | Lacombe et al. | 502/62 |
| 4,542,199 | 9/1985 | Kaminsky et al. | 526/160 |
| 4,568,659 | 2/1986 | Warzeihan et al. | 502/111 |
| 4,578,373 | 3/1986 | Graves | 502/113 |
| 4,658,078 | 4/1987 | Slaugh et al. | 585/512 |
| 4,665,047 | 5/1987 | Slaugh et al. | 502/108 |
| 4,701,432 | 10/1987 | Welborn, Jr. | 502/113 |
| 4,703,094 | 10/1987 | Raufast | 526/65 |
| 4,710,552 | 12/1987 | Bachl et al. | 526/116 |
| 4,752,597 | 6/1988 | Turner | 502/104 |
| 4,769,510 | 9/1988 | Kaminsky et al. | 585/512 |
| 4,791,180 | 12/1988 | Turner | 526/160 |
| 4,794,096 | 12/1988 | Ewen | 502/117 |
| 4,808,561 | 2/1989 | Welborn, Jr. | 502/104 |
| 4,814,540 | 3/1989 | Watanabe et al. | 585/523 |
| 4,820,786 | 4/1989 | Bacskai | 526/152 |
| 4,841,004 | 6/1989 | Kaminsky et al. | 526/160 |
| 4,871,704 | 10/1989 | Kohara et al. | 502/114 |
| 4,871,705 | 10/1989 | Hoel | 502/117 |
| 4,874,734 | 10/1989 | Kioka et al. | 502/104 |
| 4,874,880 | 10/1980 | Miya et al. | 556/53 |
| 4,892,851 | 1/1990 | Ewen et al. | 502/104 |
| 4,897,455 | 1/1990 | Welborn, Jr. | 526/129 |
| 4,912,075 | 3/1990 | Chang | 502/117 |
| 4,914,253 | 4/1990 | Chang | 585/523 |
| 4,921,825 | 5/1990 | Kioka et al. | 502/104 |
| 4,923,833 | 5/1990 | Kioka et al. | 502/9 |
| 4,925,821 | 5/1990 | Chang | 502/107 |
| 4,931,517 | 6/1990 | Fujita | 526/128 |
| 4,933,403 | 6/1990 | Kaminsky et al. | 526/160 |
| 4,935,397 | 6/1990 | Chang | 502/117 |
| 4,937,217 | 6/1990 | Chang | 502/111 |
| 4,937,301 | 6/1990 | Chang | 526/128 |
| 4,952,540 | 8/1990 | Kioka et al. | 502/9 |
| 4,962,248 | 10/1990 | Winter et al. | 585/12 |
| 4,962,262 | 10/1990 | Winter et al. | 585/512 |
| 5,001,205 | 3/1991 | Hoel | 526/128 |
| 5,006,500 | 4/1991 | Chang | 502/107 |
| 5,008,228 | 4/1991 | Chang | 502/111 |
| 5,023,388 | 6/1991 | Luker | 585/9 |
| 5,026,797 | 6/1991 | Takahashi | 526/124 |
| 5,032,562 | 6/1991 | Lo et al. | 502/111 |
| 5,034,549 | 7/1991 | Piotrowski et al. | 556/10 |
| 5,043,515 | 8/1991 | Slaugh et al. | 585/512 |
| 5,047,475 | 10/1991 | Canich et al. | 502/104 |
| 5,055,438 | 10/1991 | Canich | 502/117 |
| 5,066,631 | 11/1991 | Sangokoya et al. | 502/152 |
| 5,075,394 | 12/1991 | McDaniel et al. | 526/96 |
| 5,077,255 | 12/1991 | Welborn, Jr. | 502/104 |
| 5,084,534 | 1/1992 | Welborn, Jr. et al. | 526/160 |
| 5,086,024 | 2/1992 | Crapo et al. | 502/117 |
| 5,086,135 | 2/1992 | Kissin | 526/151 |
| 5,087,788 | 2/1992 | Wu | 585/512 |
| 5,091,352 | 2/1992 | Kioka et al. | 502/103 |
| 5,122,491 | 6/1992 | Kioka et al. | 502/117 |
| 5,126,303 | 6/1992 | Resconi et al. | 502/117 |
| 5,132,262 | 7/1992 | Rieger et al. | 502/117 |
| 5,132,381 | 7/1992 | Winter et al. | 526/160 |

(List continued on next page.)

FOREIGN PATENT DOCUMENTS 0515132  11/1992  European Pat. Off. .
0516458  12/1992  European Pat. Off. .

OTHER PUBLICATIONS

Sinn, Hansjorg et al., "Living Polymers" on Polymerization with Extremely Productive Ziegler Catalysts, Angew, Chem. Int. Ed. Engl., (1980). pp. 390–392.

Kaminsky, Walter, "Influence of Hydrogen on the Polymization of Ethylene with the Homogeneous Ziegler System bis(cyclopentadienyl)zirconiumdichloride/aluminoxane", Makromol. Chem., (1984), pp. 225–228.

(List continued on next page.)

*Primary Examiner*—David W. Wu
*Attorney, Agent, or Firm*—Alexander J. McKillop; Malcolm D. Keen; Marina V. Schneller

[57] ABSTRACT

A support containing methylalumoxane and derivatives thereof is described which is formed by an incipient impregnation technique. The most preferred support is silica. Incipient impregnation in accordance with the invention provides a supported alumoxane, methylalumoxane, which substantially eliminates the problem of fluid bed reactor fouling when methylalumoxane is introduced into the reactor during its operation. The process comprises providing methylaluminoxane in particulate form for use as a catalytic component in the fluidized bed gas phase polymerization process.

In accordance with the invention, the process comprises providing methylalumoxane activated metallocene compound in particulate form as catalysts in fluid bed gas phase.

17 Claims, 3 Drawing Sheets

U.S. PATENT DOCUMENTS

| | | | |
|---|---|---|---|
| 5,145,819 | 9/1992 | Winter et al. | 502/117 |
| 5,147,949 | 9/1992 | Chang | 526/129 |
| 5,157,008 | 10/1992 | Sangokoya et al. | 502/111 |
| 5,171,799 | 12/1992 | Kioka et al. | 26/127 |
| 5,171,871 | 12/1992 | Miyashita | 556/27 |
| 5,171,919 | 12/1992 | Watanabe et al. | 585/523 |
| 5,196,496 | 3/1993 | Galimberti et al. | 526/348.6 |
| 5,198,399 | 3/1993 | Hoff et al. | 502/111 |
| 5,200,379 | 4/1993 | McDaniel et al. | 502/154 |
| 5,206,197 | 4/1993 | Campbell, Jr. | 502/103 |
| 5,206,199 | 4/1993 | Kioka et al. | 502/117 |
| 5,208,304 | 5/1993 | Waymouth | 526/164 |
| 5,216,095 | 6/1993 | Dolle et al. | 526/127 |
| 5,223,465 | 6/1993 | Ueki et al. | 502/117 |
| 5,225,500 | 7/1993 | Elder et al. | 526/127 |
| 5,234,878 | 8/1993 | Tsutsui et al. | 502/103 |
| 5,235,081 | 8/1993 | Sangokoya | 556/179 |
| 5,238,891 | 8/1993 | Miro | 502/104 |
| 5,238,892 | 8/1993 | Chang | 502/111 |
| 5,240,894 | 8/1993 | Burkhardt et al. | 502/108 |
| 5,241,025 | 8/1993 | Hlatky et al. | 526/129 |
| 5,242,876 | 9/1993 | Shamshoum et al. | 502/113 |
| 5,279,999 | 1/1994 | DeBoer et al. | 502/117 |
| 5,281,679 | 1/1994 | Jejelowo et al. | 526/114 |
| 5,296,565 | 3/1994 | Ueda et al. | 526/114 |
| 5,304,523 | 4/1994 | Razavi | 502/152 |
| 5,308,811 | 5/1994 | Suga et al. | 502/62 |
| 5,308,815 | 5/1994 | Sangokoya | 502/104 |
| 5,308,816 | 5/1994 | Tsutsui et al. | 502/108 |
| 5,317,036 | 5/1994 | Brady, III et al. | 523/223 |

OTHER PUBLICATIONS

Kaminsky, Walter, "Bix(cyclopentadienyl) zirkon–Verbindungen and Aluminoxanals Ziegler–Katalysatoren fur die Polymerisation und Copolymerisation von Olefinen", Makromol. Chem., (1983), pp. 417–421.

Kaminsky, Walter, "Isotactic polymerization of propene with (n–1,1'–ethylenedi–4,5,6, 7–tetrahydroindenyl)zirconium dichloride combined with methylaluminoxanee", Makromol. Chem. (1987), pp. 305–310.

Furtek, A. B., "Ultra Strength Polyethylene Resins Produced in a Fluid–Bed Process Utilizing Metallocene–Based catalysts", Catalyst Consultants, Inc., 125–137, May 1993.

MOLECULAR WEIGHT

MOLECULAR WEIGHT

PROCESS AND A CATALYST FOR PREVENTING REACTOR FOULING

This is a division of application Ser. No. 07/997,421, filed on Dec. 18, 1992 now U.S. Pat. No. 5,332,706.

FIELD OF THE INVENTION

The invention relates to modifications and improvements in low pressure fluid bed gas phase systems for the polymerization and copolymerization of ethylene, undertaken in the presence of catalysts comprising metallocenes of transition metals. The invention relates to eliminating reactor fouling and to maintaining the continuous operation of the distributor plate in the fluid bed gas phase reactor undertaken in the presence of catalysts comprising metallocenes of transition metals. Moreover, the invention relates to maintaining the continuous polymerization and copolymerization of ethylene in the fluid bed reactor.

BACKGROUND OF THE INVENTION

Polyethylene is produced commercially in a gas phase reaction in the absence of solvents by employing selected chromium and titanium-containing catalysts under specific operating conditions in a fluid bed process. The products of those original processes exhibited medium-to-broad molecular weight distribution To be commercially useful in the gas phase fluid bed process, the catalyst must exhibit high activity, with concomitant high catalyst productivity, because gas phase process systems do not include catalyst residue removal procedures. Accordingly, catalyst residue in the polymer product must be so small that it can be left in the polymer without causing any undue problems in the fabrication and/or to the ultimate consumer. To this end, the patent literature is replete with developments of new catalysts, of high activity with corresponding high productivity values.

The use of metallocene compounds of transition metals as catalysts for polymerization and copolymerization of ethylene is one of those developments. Metallocenes can be described by the empirical formula $Cp_mMA_nB_p$. These compounds in combination with methylalumoxane (MAO) have been used to produce olefin polymers and copolymers, such as ethylene and propylene homopolymers, ethylene-butene and ethylene-hexene copolymers, e.g., see Kaminsky et al, U.S. Pat. No. 4,542,199 and Sinn et al, U.S. Pat. No. 4,404,344, the entire contents of both of which are incorporated herein by reference. Unlike traditional titanium- and vanadium-based Ziegler-Natta catalysts, a metallocene, e.g. a zirconocene catalyst, free of titanium- and vanadium-components produce resins with very narrow molecular weight distributions (determined as $MFR(I_{21}/I_2)$ of 15 to 18, versus MFR of 25 to 30 for titanium-based catalysts) and with homogeneous short-chain branching distributions. When traditional titanium- and vanadium-based catalysts are used to copolymerize ethylene and higher alpha-olefins, the olefin is incorporated in polymer chains nonuniformly, and most of the olefin resides in the shortest polymer chains. With zirconocene catalyst, however, the branching distribution is essentially independent of chain length. LLDPE resins produced with zirconocene catalysts have superior properties. These resins can be used to make films with significantly better clarity and impact strength. Extractables of such resins are lower and the balance of properties in the films between the machine and transverse directions is excellent. More recently, as exemplified in U.S. Pat. No. 5,032,562, metallocene catalysts containing a second transition metal, such as titanium have been developed which produce bimodal molecular weight distribution products, having a high molecular weight component and a relatively lower molecular weight component. The development of a catalyst which can produce bimodal products in a single reactor is significant per se. That development also provides a commercial alternative to processes which require two reactors to produce bimodal production with production of one of the molecular weight components in a first reactor and transfer of that component to a second reactor and completion of the polymerization with production of the other component of different molecular weight.

Methylalumoxane (MAO) is used as co-catalyst with metallocene catalysts. The class of alumoxanes comprises oligomeric linear and/or cyclic alkylalumoxanes represented by the formula: $R-(Al(R)-O)_x-AlR_2$ for oligomeric, linear alumoxanes and $(-Al(R)-O-)_y$ for oligomeric cyclic alumoxane wherein x is 1–40, preferably 10–20, y is 3–40, preferably 3–20 and R is a $C_1$–$C_8$ alkyl group and preferably methyl. Methylalumoxane is commonly produced by reacting trimethylaluminum with water or with hydrated inorganic salts, such as $CuSO_4.5H_2O$ or $Al_2(SO_4)_3.5H_2O$. Methylalumoxane can be also generated in situ in polymerization reactors by adding to them trimethylaluminum and water or water-containing inorganic salts. MAO is a mixture of oligomers with a very wide distribution of molecular weights and usually with an average molecular weight of about 1200. MAO is typically kept in solution in toluene. While the MAO solutions remain liquid at fluid bed reactor temperatures, the MAO itself is a solid at room temperature.

Most of the experiments reported in the literature relating to methylalumoxane used as a cocatalyst with metallocene catalysts are undertaken in a slurry or solution process, rather than in a gas phase fluid bed reactor process.

It was found that the metallocene catalyst must contact the MAO cocatalyst while MAO is in solution in order for the catalyst to be activated in the fluid bed reactor.

SUMMARY OF THE INVENTION

In accordance with the invention, it was found that the metallocene catalyst must contact the alumoxane, e.g. MAO, while MAO is in solution in order for the metallocene to be activated in the fluid bed reactor. Moreover, in accordance with the invention, it was discovered that extensive reactor fouling results when MAO solutions are fed directly into the gas phase reactor in large enough quantities to provide this liquid contact. The fouling occurs because the MAO solution forms a liquid film on the interior walls of the reactor. The catalyst is activated when it comes into contact with this liquid film, and the activated catalyst reacts with ethylene to form a polymer coating which grows larger in size until the reactor is fouled. In addition, since substantially all of the activation takes place on the walls, the MAO is not uniformly distributed to the catalyst particles. The resulting non-homogeneous polymerization gives low catalyst activity and poor product properties.

The problems invoked by the use of an alumoxane, methylalumoxane, in catalyst production are addressed by a process for forming a carrier material impregnated with alumoxane and derivatives thereof, comprising (1) providing a carrier, which has hydroxyl groups, which is porous and has a particle size of 1 to 200 microns, having pores which have an average diameter of 50 to 500 Angstroms and having a pore volume of 0.5 to 5.0 cc/g of carrier;

(2) providing a volume of a solution comprising a solid alumoxane and a solvent therefor, wherein the concentration of alumoxane, expressed as Al weight percent is 5 to 20;

wherein the methylalumoxane provides aluminum in an amount sufficient to provide a ratio of Al to silica, i.e., Al/silica (wt/wt) ranging from 0.10 to 0.40.

(3) contacting the said solution with the carrier and allowing the solution to impregnate the pores of the carrier, having a pore volume of 0.5 to 5.0 cc/g, containing methylalumoxane within said pores.

(4) after said contacting, recovering a dry impregnated carrier.

Accordingly, the invention includes the foregoing process, the product(s) thereof, the catalysts formed therefrom, and the polymerizations and copolymerizations achieved thereby.

DETAILED DESCRIPTION OF THE INVENTION

Figure 1:
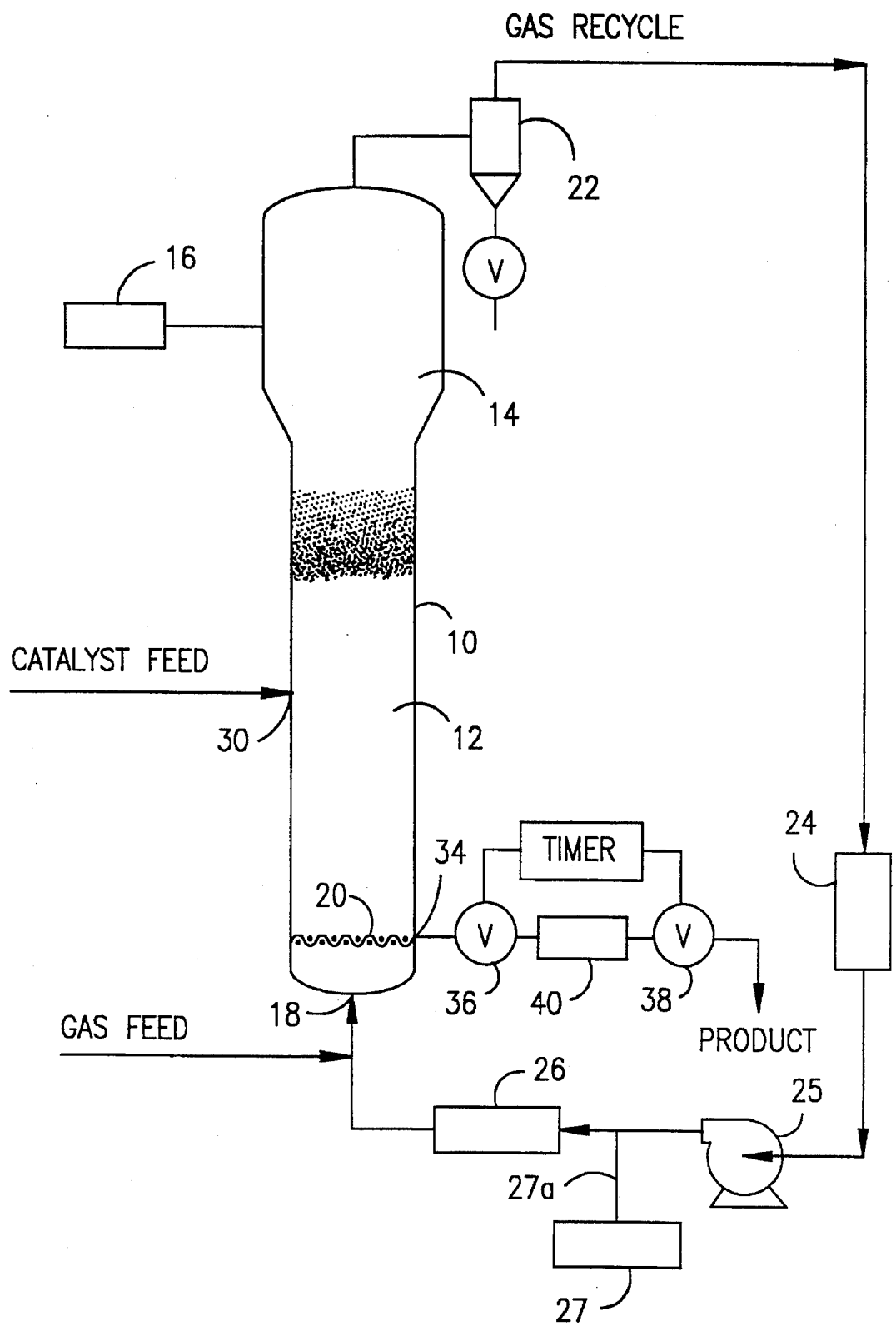
FIG. 1 is a schematic drawing of a fluid bed reactor for gas phase polymerization of ethylene.

Ethylene polymers, as well as copolymers of ethylene with one or more $C_3$–$C_{10}$ alpha-olefins, can be produced in accordance with the invention. Thus, copolymers having two monomeric units are possible as well as terpolymers having three monomeric units. Particular examples of such polymers include ethylene/1-butene copolymers, ethylene/1-hexene copolymers and ethylene/4-methyl-1-pentene copolymers.

Hydrogen may be used as a chain transfer agent in the polymerization reaction of the present invention. The ratio of hydrogen/ethylene employed will vary between about 0 to about 2.0 moles of hydrogen per mole of ethylene in the gas phase. Any gas inert to the catalyst and reactants can also be present in the gas stream.

Ethylene/1-butene and ethylene/1-hexene copolymers are the most preferred copolymers polymerized in the process of and with the catalyst of this invention. The ethylene copolymers produced in accordance with the present invention preferably contain at least about 80 percent by weight of ethylene units. The cocatalyst of this invention can also be used with the catalyst precursor of this invention to polymerize propylene and other alpha-olefins and to copolymerize them. The structure of alpha-olefin polymers prepared with the cocatalyst and the catalyst precursor of this invention depends on the structure of the cyclopentadienyl ligands attached to the metal atom in the catalyst precursor molecule. The cocatalyst compositions of this invention can also be used with the catalyst precursors of this invention to polymerize cycloolefins such as cyclopentene.

In one embodiment, the catalyst of the invention exhibits high activity for polymerization of ethylene and higher alpha-olefins and allows the synthesis of ethylene polymers and copolymers with a relatively narrow molecular weight distribution and homogeneous branching distribution. The molecular weight distribution is determined as MFR which ranges from 15 to 25, in polymerizations of the invention. Branching distribution in ethylene copolymers is evaluated on the basis of the resin's melting point. Relatively homogeneous branching distribution is one which the melting point ranges from 100° to 120° C., depending on comonomer composition. In this embodiment, the catalyst of the invention contains only one source of transition metal, a metallocene.

In another embodiment of the invention, the catalyst of the invention exhibits high activity for polymerization of ethylene and higher alpha-olefins and allows the synthesis of ethylene polymers and copolymers with a broad molecular weight distribution and generally, bimodal molecular weight distribution with a relatively high molecular weight component and with a relatively lower molecular weight component in the resin blend. The molecular weight distribution of the bimodal resin, expressed as MFR, is about 110 to about 140. In this embodiment, the catalyst of the invention comprises two transition metal compounds, only one of the transition metal compounds being a metallocene.

In another embodiment of the invention a catalyst of the invention exhibits high activity for copolymerization of ethylene and higher alpha-olefins and allows the synthesis of linear low density polyethylene with a relatively narrow molecular weight distribution and homogeneous branching distribution. The molecular weight distribution is determined as MFR which ranges from 14 to 24, in polymerizations of the invention. In this embodiment, the catalyst of the invention contains only one source of transition metal, a metallocene.

The Fluidized Bed Reactor

A fluidized bed reaction system which can be used in the practice of the process of the present invention is shown in FIG. 1. With reference thereto, the reactor 10 consists of a reaction zone 12, a velocity reduction zone 14 and the distributor plate 20. Although fouling can occur in all of the cold areas (areas in a reactor at a temperature which is less than the temperature at which any component(s), in the gas phase reactor are liquid rather than gaseous) distributor plate fouling is the one most easily detected, since it results in a rapid increase in the pressure drop across the distributor plate due to flow restriction. Such flow restrictions also result in changing fluidization patterns and contribute to reactor wall fouling. The lowest temperature in the reactor loop is in the reactor inlet beneath the distributor plate. Other areas representing the coldest sections in the fluid bed reactor system include the cooler and piping between the cooler and the bottom head.

The reaction zone 12 comprises a bed of growing polymer particles and a minor amount of catalyst particles fluidized by the continuous flow of polymerizable and modifying gaseous components. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization" *Chemical Engineering Progress symposium series,* Vol. 62, p. 100–111 (1966). The distribution plate 20 serves the purpose of diffusing recycle gas through the bed at a rate sufficient to maintain fluidization at the base of the bed. Fluidization is achieved by a high rate of gas recycle to and through the bed, typically in the order of about 50 times the rate of feed of make-up gas. Make-up gas is fed to the bed at a rate equal to the rate at which particulate polymer product is formed by reaction. The composition of the make-up gas is determined by a gas analyzer 16 positioned above the bed. The composition of the make-up gas is continuously adjusted to maintain an essentially steady state gaseous composition within the reaction zone.

The portion of the gas stream which does not react in the bed (the recycle gas) passes a velocity reduction zone 14 where entrained particles are given an opportunity to drop back into the bed, through a cyclone 22, through a filter 24 (optionally) and is compressed in a compressor 25, passes through a heat exchanger 26 and is returned to the bed. The distribution plate 20 serves the purpose of diffusing recycle gas through the bed at a rate sufficient to maintain fluidization. The plate may be a screen, slotted plate, perforated plate, a plate of the bubble cap type, and the like. The elements of the plate may all be stationary, or the plate may be of the mobile type disclosed in U.S. Pat. No. 3,298,792.

Conditions in the Fluid Bed Reactor for the Gas Phase Polymerization and Copolymerization of Ethylene It is essential to operate the fluid bed reactor at a temperature below the sintering temperature of the polymer particles. For the production of ethylene copolymers in the process of the present invention an operating temperature of about 30° to 115° C. is preferred, and a temperature of about 75° to 95° C. is most preferred. Temperatures of about 75° to 90° C. are used to prepare products having a density of about 0.91 to 0.92, and temperatures of about 80° to 100° C. are used to prepare products having a density of about 0.92 to 0.94, and temperatures of about 90° to 115° C. are used to prepare products having a density of about 0.94 to 0.96.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated catalyst is injected into the bed at a point above the distribution plate at a rate equal to its consumption. Since the catalysts used in the practice of this invention are highly active, injection of the fully activated catalyst into the area below the distribution plate may cause polymerization to begin there and eventually cause plugging of the distribution plate. Injection into the bed, instead, aids in distributing the catalyst throughout the bed and precludes the formation of localized spots of high catalyst concentration.

The production rate of polymer in the bed is controlled by the rate of catalyst injection. Since any change in the rate of catalyst injection changes the rate of generation of the heat of reaction, the temperature of the recycle gas is adjusted to accommodate the change in rate of heat generation. Complete instrumentation of both the fluidized bed and the recycle gas cooling system is, of course, necessary to detect any temperature change in the bed so as to enable the operator to make a suitable adjustment in the temperature of the recycle gas.

Since the rate of heat generation is directly related to product formation, a measurement of the temperature rise of the gas across the reactor (the difference between inlet gas temperature and exit gas temperature) is determinative of the rate of particulate polymer formation at a constant gas velocity.

Under a given set of operating conditions, the fluidized bed is maintained at essentially a constant height by withdrawing a portion of the bed as product at a rate equal to the rate of formation of the particulate polymer product.

Catalyst Composition

Catalysts which contain only one transition metal in the form of a metallocene have an activity of at least about 3,000 g polymer/g catalyst or about 1,000 kg polymer/g transition metal. Catalysts which contain two transition metals, one in the form of a metallocene and one transition metal in the form of a non-metallocene, have an activity of at least about 2,000 g polymer/g catalyst or about 100 kg polymer/g of transition metals.

The catalysts of the invention comprise a cocatalyst comprising an aluminum alkyl compound, such as a trialkyl aluminum free of alumoxane, and a catalyst precursor comprising a carrier, an alumoxane and at least one metallocene; in one embodiment the catalysts further include a non-metallocene transition metal source.

The carrier material is a solid, particulate, porous, preferably inorganic material, such as an oxide of silicon and/or of aluminum. The carrier material is used in the form of a dry powder having an average particle size of from about 1 micron to about 250 microns, preferably from about 10 microns to about 150 microns. If necessary, the treated carrier material may be sieved to insure that the particles of the ultimate carrier-catalyst containing composition has material is also porous and has a mesh size of greater than 150 mesh. This is highly desirable in the embodiment of the invention, in which the catalyst contains only one transition metal in the form of a metallocene and which is used to form narrow molecular weight LLDPE, to reduce gels. The surface area of the carrier is at least about 3 square meters per gram ($m^2$/gm), and preferably at least about 50 $m^2$/gm up to about 350 $m^2$/gm. The carrier material should be dry, that is, free of absorbed water. Drying of the carrier material can be effected by heating at about 100° C. to about 1000° C., preferably at about 600° C. When the carrier is silica, it is heated to at least 200° C., preferably about 200° C. to about 850° C. and most preferably at about 600° C. The carrier material must have at least some active hydroxyl (OH) groups to produce the catalyst composition of this invention.

In the most preferred embodiment, the carrier is silica which, prior to the use thereof in the first catalyst synthesis step, has been dehydrated by fluidizing it with nitrogen and heating at about 600° C. for about 16 hours to achieve a surface hydroxyl group concentration of about 0.7 millimoles per gram (mmols/gm). The silica of the most preferred embodiment is a high surface area, amorphous silica (surface area=300 $m^2$/gm; pore volume of 1.65 $cm^3$/gm), and it is a material marketed under the tradenames of Davison 952 or Davison 955 by the Davison Chemical Division of W. R. Grace and Company. The silica is in the form of spherical particles, e.g., as obtained by a spray-drying process.

To form catalysts of the invention, all catalyst precursor components can be dissolved with alumoxane and impregnated into the carrier. In a unique process, the carrier material is impregnated with a solid alumoxane, preferably methylalumoxane, in a process described below. The class of alumoxanes comprises oligomeric linear and/or cyclic alkylalumoxanes represented by the formula: R-(Al(R)-O)$_x$-AlR$_2$ for oligomeric, linear alumoxanes and (-Al(R)-O-)$_y$ for oligomeric cyclic alumoxane wherein x is 1–40, preferably 10–20, y is 3–40, preferably 3–20 and R is a $C_1$–$C_8$ alkyl group and preferably methyl. MAO is a mixture of oligomers with a very wide distribution of molecular weights and usually with an average molecular weight of about 1200. MAO is typically kept in solution in toluene. While the MAO solutions remain liquid at fluid bed reactor temperatures, the MAO itself is a solid.

Although the alumoxane can be impregated into the carrier at any stage of the process of catalyst preparation, the preferred stage of alumoxane incorporation will depend on the ultimate catalyst sought to be synthesized. The volume of the solution comprising a solid alumoxane and a solvent therefor can vary, depending on the catalyst sought to be produced. In a preferred embodiment, of alumoxane incorporation into the carrier, one of the controlling factors in the alumoxane incorporation into the carrier material catalyst synthesis is the pore volume of the silica. In this preferred embodiment, the process of impregnating the carrier material is by infusion of the alumoxane solution, without forming a slurry of the carrier material, such as silica, in the alumoxane solution. The volume of the solution of the alumoxane is sufficient to fill the pores of the carrier material without forming a slurry in which the volume of the solution exceeds the pore volume of the silica; accordingly and preferably, the maximum volume of the alumoxane solution is, does not exceed, the total pore volume of the carrier material sample. That maximum volume of the alumoxane solution insures that no slurry of silica is formed. Accordingly, if the pore volume of the carrier material is 1.65 $cm^3/g$, then the volume of alumoxane will be equal to or less than 1.65 $cm^3$/gram of carrier material. As a result of this proviso, the impregnated carrier material will appear dry immediatedly following impregnation although the pores of the carrier will be filled with inter alia solvent.

Solvent may be removed from the alumoxane impregnated pores of the carrier material by heating and/or under a positive pressure induced by an inert gas, such as nitrogen. If employed, the conditions in this step are controlled to reduce, if not to eliminate, agglomeration of impregnated carrier particles and/or crosslinking of the alumoxane. In this step, solvent can be removed by evaporation effected at relatively low elevated temperatures of above about 40° and below about 50° to obviate agglomeration of catalyst particles and crosslinking of the alumoxane. Although solvent can be removed by evaporation at relatively higher temperatures than that defined by the range above 40° and below about 50° C., very short heating times schedules must be employed to obviate agglomeration of catalyst particles and crosslinking of the alumoxane.

In a preferred embodiment, the metallocene is added to the solution of the alumoxane prior to impregnating the carrier with the solution. Again the maximum volume of the alumoxane solution also including the metallocene is the total pore volume of the carrier material sample. The mole ratio of alumoxane provided aluminum, expressed as A1, to metallocene metal expressed as M (e.g. Zr), ranges from 50 to 500, preferably 75 to 300, and most preferably 100 to 200. An added advantage of the present invention is that this Al:Zr ratio can be directly controlled. In a preferred embodiment the alumoxane and metallocene compound are mixed together at a temperature of about 20° to 80° C., for 0.1 to 6.0 hours, prior to use in the infusion step. The solvent for the metallocene and alumoxane can be appropriate solvents, such as aromatic hydrocarbons, halogenated aromatic hydrocarbons, ethers, cyclic ethers or esters, preferably it is toluene.

The metallocene compound has the formula $Cp_mMA_nB_p$ in which Cp is an unsubstituted or substituted cyclopentadienyl group, M is zirconium or hafnium and A and B belong to the group including a halogen atom, hydrogen or an alkyl group. In the above formula of the metallocene compound, the preferred transition metal atom M is zirconium. In the above formula of the metallocene compound, the Cp group is an unsubstituted, a mono- or a -polysubstituted cyclopentadienyl group. The substituents on the cyclopentadienyl group can be preferably straight-chain $C_1$–$C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when m in the above formula of the metallocene compound is equal to 2, the cyclopentadienyl groups can be also bridged by polymethylene or dialkylsilane groups, such as $-CH_2-$, $-CH_2-CH_2-$, $-CR'R''-$ and $-CR'R''-CR'R''-$ where R' and R'' are short alkyl groups or hydrogen, $-Si(CH_3)_2-$, $Si(CH_3)_2-CH_2-CH_2-Si(CH_3)_2-$ and similar bridge groups. If the A and B substituents in the above formula of the metallocene compound are halogen atoms, they belong to the group of fluorine, chlorine, bromine or iodine. If the substituents A and B in the above formula of the metallocene compound are alkyl groups, they are preferably straight-chain or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1$–$C_6$ alkyls. Illustrative, but non-limiting examples of metallocenes include bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)zirconium dichloride, cyclopentadienyl-zirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl)]zirconium dichloride. The metallocene compounds utilized within the embodiment of this art can be used as crystalline solids, as solutions in aromatic hydrocarbons or in a supported form.

As stated above, the alumoxane can be impregnated into the carrier at any stage of the process of catalyst preparation. When the catalyst contains two transition metals components, one of which is a metallocene, and one of which is non-metallocene (free of unsubstituted or substituted cyclopentadienyl groups) the impregnation of the alumoxane in accordance with the unique method described above is preferably undertaken after hydroxyl groups of the carrier material are reacted with an organomagnesium compound and the non-metallocene transition metal compound. In this embodiment, the amount of A1, provided by alumoxane, is sufficient to provide an Al:transition metal (provided by metallocene) mole ratio ranging from 50 to 500, preferably 100 to 300. The carrier material, having said (OH) groups, is slurried in a non-polar solvent and the resulting slurry is contacted with at least one organomagnesium composition having the empirical formula below. The slurry of the carrier material in the solvent is prepared by introducing the carrier into the solvent, preferably while stirring, and heating the mixture to about 25° to about 70° C., preferably to about 40° to about 60° C. Temperatures here are critical with respect to the non-metallocene transition metal which is subsequently added; that is temperatures in this slurry of about 90°

C. result in deactivation of the transition metal added subsequently. The slurry is then contacted with the aforementioned organomagnesium composition, while the heating is continued at the aforementioned temperature.

The organomagnesium composition has the empirical formula $$R_q Mg R'_y$$

where R and R' are the same or different $C_2$–$C_{12}$ alkyl groups, preferably $C_4$–$C_{10}$ alkyl groups, more preferably $C_4$–$C_8$ normal alkyl groups, and most preferably both R and R' are n-butyl groups, and m and n are each 0, 1 or 2, providing that q+y is equal to the valence of Mg.

Suitable non-polar solvents are materials in which all of the reactants used herein, i.e., the organomagnesium composition, and the transition metal compound, are at least partially soluble and which are liquid at reaction temperatures. Preferred non-polar solvents are alkanes, such as hexane, n-heptane, octane, nonane, and decane, although a variety of other materials including cycloalkanes, such as cyclohexane, aromatics, such as benzene, toluene and ethylbenzene, may also be employed. The most preferred non-polar solvent is cyclopentane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium composition that will be deposited—physically or chemically—onto the support since any excess of the organomagnesium composition in the solution may react with other synthesis chemicals and precipitate outside of the support. The carrier drying temperature affects the number of sites on the carrier available for the organomagnesium composition - the higher the drying temperature the lower the number of sites. Thus, the exact molar ratio of the organomagnesium composition to the hydroxyl groups on the carrier will vary and must be determined on a case-by-case basis to assure that only so much of the organomagnesium composition is added to the solution as will be deposited onto the support without leaving any excess of the organomagnesium composition in the solution. Furthermore, it is believed that the molar amount of the organomagnesium composition deposited onto the support is greater than the molar content of the hydroxyl groups on the support. Thus, the molar ratios given below are intended only as an approximate guideline and the exact amount of the organomagnesium composition in this embodiment must be controlled by the functional limitation discussed above, i.e., it must not be greater than that which can be deposited onto the support. If greater than that amount is added to the solvent, the excess may react with the non-metallocene transition metal compound, thereby forming a precipitate outside of the support which is detrimental in the synthesis of our catalyst and must be avoided. The amount of the organomagnesium composition which is not greater than that deposited onto the support can be determined in any conventional manner, e.g., by adding the organomagnesium composition to the slurry of the carrier in the solvent, while stirring the slurry, until the organomagnesium composition is detected as a solution in the solvent.

For example, for the silica carrier heated at about 600° C., the amount of the organomagnesium composition added to the slurry is such that the molar ratio of Mg to the hydroxyl groups (OH) on the solid carrier is about 0.5:1 to about 4:1, preferably about 0.8:1 to about 3:1, more preferably about 0.9:1 to about 2:1 and most preferably about 1:1. The organomagnesium composition dissolves in the non-polar solvent to form a solution from which the organomagnesium composition is deposited onto the carrier.

It is also possible to add such an amount of the organomagesium composition which is in excess of that which will be deposited onto the support, and then remove, e.g., by filtration and washing, any excess of the organomagnesium composition. However, this alternative is less desirable than the most preferred embodiment described above.

After the addition of the organomagnesium composition to the slurry is completed, the slurry is contacted with a non-metallocene transition metal compound, free of substituted or unsubstituted cyclopentadienyl groups. The slurry temperature must be maintained at about 25° to about 70° C., preferably to about 40° to about 60° C. As noted above, temperatures in this slurry of about 80° C. or greater result in deactivation of the non-metallocene transition metal. Suitable non-metallocene transition metal compounds used herein are compounds of metals of Groups IVA, and VA, of the Periodic Chart of the Elements, as published by the Fisher Scientific Company, Catalog No. 5-702-10, 1978, providing that such compounds are soluble in the non-polar solvents. Non-limiting examples of such compounds are titanium and vanadium halides, e g , titanium tetrachloride, $TiCl_4$, vanadium tetrachloride, $VCl_4$, vanadium oxytrichloride, $VOCl_3$, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride. The amount of titanium or vanadium, in non-metallocene form ranges from a Ti/Mg molar ratio of 0.5 to 2.0, preferably from 0.75 to 1.50.

Mixtures of such non-metallocene transition metal compounds may also be used and generally no restrictions are imposed on the transition metal compounds which may be included. Any transition metal compound that may be used alone may also be used in conjunction with other transition metal compounds.

Incorporation of the alumoxane-metallocene can be directly to this slurry. Alternatively, and in accordance with the unique method of infusion of alumoxane into the pores of the carrier, described above, the carrier slurry can be stripped of solvent, after the addition of the non-metallocene transition metal compound, to form a free-flowing powder. The free flowing powder can then be impregnated by determining the pore volume of the carrier and providing an alumoxane (or metallocene-alumoxane) solution in a volume equal to or less than that of the pore volume of the carrier, and recovering a dry catalyst precursor. The resulting free-flowing powder, referred to herein as a catalyst precursor, is combined with an activator (sometimes referred as a cocatalyst). The cocatalyst can be a trialkylaluminum, free of alumoxane. Preferably, trimethylaluminum (TMA) is the cocatalyst or activator. The amount of the TMA activator is sufficient to give an Al:Ti molar ratio of about 10:1 to about 1000:1, preferably about 15:1 to about 300:1, and most preferably about 20:1 to about 100:1. The catalyst exhibits high activity for long periods of time in the pilot plant, and exhibits little deactivation.

The catalyst precursor of this invention comprises a metallocene compound and an alumoxane which is fed to the fluid bed reactor for gas phase polymerizations and copolymerizations of ethylene in particulate form. Moreover, in accordance with the invention, the cocatalyst or activator is fed to the fluid bed reactor for polymerizations and copolymerizations of ethylene in the absence of alumoxane solution.

EXAMPLES

EXAMPLE 1

The titanium component of the catalyst was prepared using a chemical impregnation technique. The zirconium component of the catalyst was prepared using a physical impregnation method. Solution (A): To a 50 ml serum-bottle 0.140 grams of $Cp_2ZrCl_2$ was transferred and then 10.2 grams of a methylalumoxane (13.2 wt. % A1) solution were added. The solution remained at room temperature for 60 minutes until the entire contents were transferred to the silica slurry described below.

Into a 100 ml pear-flask equipped with a magnetic stirring bar, 3.0 grams of Davison 955 silica calcined at 600°, was added followed by addition of about 20 ml. dry toluene. The flask was placed into a 59° C. oil bath. Next, 2.9 ml. of dibutylmagnesium (0.74 mmol/ml) was added to the silica/toluene slurry. The contents of the flask were stirred for 25 minutes. Then, 2.3 mls of a 0.94 molar titanium tetrachloride solution in heptane was added to the flask. The slurry turned a dark brown color and stirring was continued for 25 minutes. Finally, the entire contents of solution (A) was transferred into the catalyst preparation flask, and the slurry was allowed to stir for 10 minutes. After this time, all solvents were removed by evaporation under a nitrogen purge. Catalyst yield was 5.6 grams of a dark-brown free-flowing powder. The Al/Zr ratio was 104.

EXAMPLE 2

Ethylene/1-hexene copolymer was prepared with the catalyst of the foregoing example under polymerization conditions to produce high density polyethylene (HDPE), with a flow index ($I_{21}$) of about 6.

A 1.6 liter stainless steel autoclave, at about 50° C., was filled with 0.750 liters of dry heptane, 0.030 liters of dry 1-hexene and 4.0 mmols of trimethylaluminum (TMA) while under a slow nitrogen purge. The reactor was closed, the stirring rate was set at about 900 rpm, the internal temperature was increased to 85° C. and the internal pressure was raised from 7 psi to 10 psi with hydrogen. Ethylene was introduced to maintain the reactor pressure at about 203 psi. Next, 0.0639 grams of catalyst was introduced into the reactor with ethylene over pressure and the temperature was increased and held at 95° C. The polymerization was continued for 60 minutes, and then the ethylene supply was stopped and the reactor allowed to cool to room temperature. 78 grams of polyethylene were collected.

Figure 2:
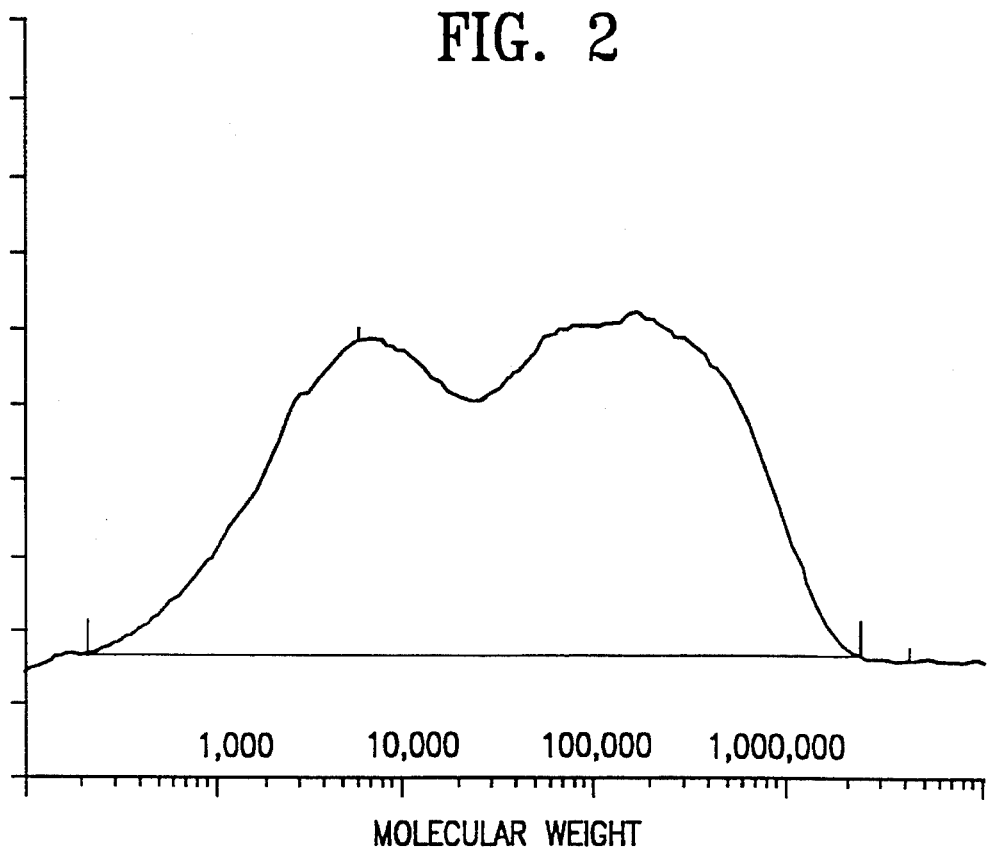
FIG. 2 is a gel permeation chromatograph of the product of Example 2.
Figure 3:
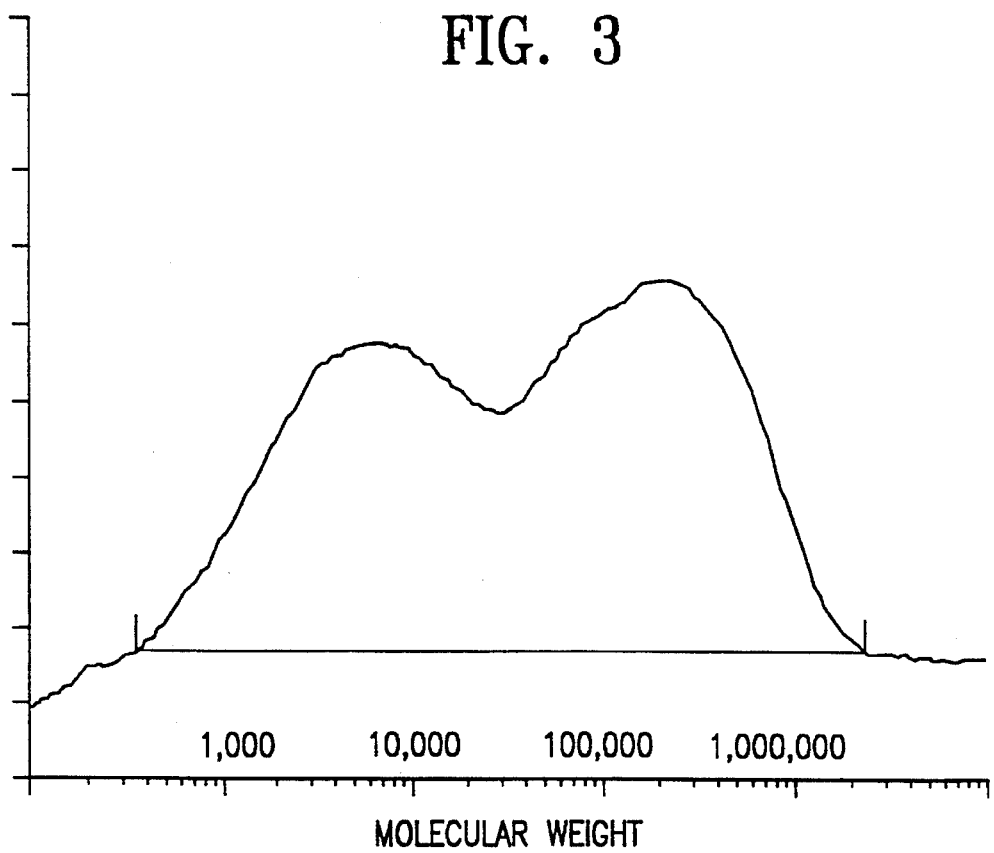
FIG. 3 is a gel permeation chromatograph of a bimodal product produced in two reactors.

The molecular weight distribution (MWD) of the polymer was examined by Gel Permeation Chromatography (GPC), and the results clearly show that the polymer has a bimodal MWD (FIG. 2). FIG. 3 shows the GPC chromatogram for a HDPE polymer prepared in tandem gas phase reactor. Comparison of the two GPC chromatograms clearly shows that the polymer prepared in a single reactor is essentially the same as the polymer prepared in two tandem reactors.

Presently, commercial samples of HDPE with a bimodal MWD are produced in a tandem reactor process. In that process, two reactors are run in series and the catalyst is exposed to ethylene polymerization conditions in one reactor, and the resulting polymer-catalyst particles are transferred to a second reactor for additional polymerization. One of the main process differences in the two different reactors, is that the amount of hydrogen is different in the two different reactors. Relatively lower molecular weight product is produced in the reactor containing more hydrogen, because the hydrogen acts as a chain transfer agent; whereas relatively higher molecular weight product is produced in the reactor containing lesser relative amounts of hydrogen.

EXAMPLE 3

This catalyst was prepared in two stages. 495 grams of Davison grade 955 silica, previously calcined with dry nitrogen for about 12 hours at 600° C, was added to a 2 gallon stainless steel autoclave under a slow nitrogen purge to eliminate oxygen and moisture from the catalyst preparation vessel. Then, 4.0 liters of dry isopentane (IC5) was added to the autoclave and the silica/IC5 were slurried at about 100 rpm and the internal temperature was maintained at about 55–60° C. Next, 469 ml of a 0.76 molar solution of dibutylmagnesium in heptane was added to the silica/IC5 slurry and stirring was continued for 60 minutes. Next, 39.1 ml of neat titanium tetrachloride was diluted with about 40 ml of IC5 and this solution was added to the autoclave and stirring was continued for 60 minutes. Finally, the solvents were removed with a nitrogen purge through a vent line and 497 grams of a brown free-flowing powder were obtained. Ti found was 2.62 wt %; Mg found was 1.33 wt % and Ti/Mg molar ratio was 1.0.

492 grams of the product of the first stage was added to a 1.6 gallon glass catalyst preparation vessel fitted with a temperature jacket and an internal stirrer. The product of the first stage had an estimated pore volume of 1.5 cc/g (i.e. 738 cc of pore volume). Then into a stainless steel Hoke bomb was added 13.93 grams of $(BuCp)2ZrCl_2$ (34.4 mmol Zr) and 717.5 ml of a methylalumoxane solution (3,444 mmol of A1) in toluene (4.8 Molar). Note: The total volume of the methylalumoxane/toluene solution is equal to or less than the total pore volume of the product of the first step. Next, the toluene solution containing the methylalumoxane and the zirconium compound were mixed and then the solution was added to the product of the first step in approximately 5 ml aliquots over 90 minutes; (during this time, the product of the first step remains completely dry and always consists of a free-flowing powder). Finally, nitrogen is purged through the glass vessel for about 5 hours with the jacket temperature at about 45° C. Yield: 877 grams of a free-flowing powder. Ti found was 1.85 wt %; Zr found was 0.30 wt %.

EXAMPLE 4

The catalyst described in Example 3 was examined in a pilot plant fluid bed gas phase reactor under the following conditions:

| | |
|---|---|
| ethylene | 180 psi |
| hydrogen/ethylene | 0.005–0.008 |
| hexene/ethylene | 0.015 |
| reactor temperature | 95° C. |

The resin prepared at a productivity of about 1400 g polymer/g catalyst had the following characteristics:

| | |
|---|---|
| average particle size | 0.017 inches |
| resin metal content | 13.0 ppm |

|                                  |            |
|----------------------------------|------------|
| HLMI (I21)                       | 5.3        |
| MFR (I21/I2.16)                  | 113        |
| Density                          | 0.949 g/cc |

Figure 4:
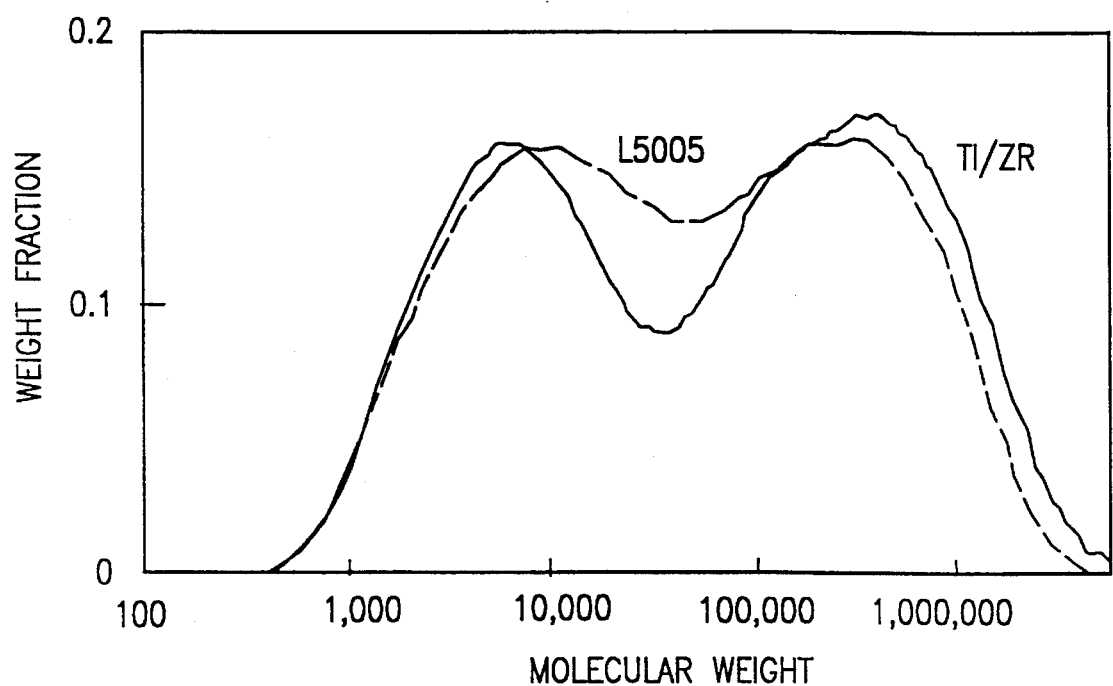
FIG. 4 is a gel permeation chromatograph of Example 4 product.

The GPC curve of this product is in FIG. 4 and is compared to a commercially produced tandem unit in a two stage process, in which a different molecular weight component is made in each stage.

Properties of films of the product of Example 4 are compared to the commercially produced product OxyChem L5005.

| Sample | Ti/Zr | OxyChem L5005 |
|---|---|---|
| $I_{21}$ | 5.3 | 8.0 |
| MFR | 113 | 160 |
| Density | 0.949 | 0.950 |
| Throughput, lb/hr | 98 | 120 |
| Melt Pressure (at 120 lb/hr), psi | 7550 | 6450 |
| FQR | 15 | 15 |
| Dart Drop, 1 mil. g | 565 | 325 |
| 0.5 mil, g | 410 | 420 |
| MD Elmendorf Tear, 0.5 mil. g/mil | 37 | 25 |

The results in the GPC curve of FIG. 4 show that the Example 4 bimodal product has a high molecular weight component with higher molecular weight than that produced in the tandem two reactor process. The film of Example 4 is substantially reduced in, if not free of, gel content. The film of the Example 4 product has improved dart impact.

COMPARATIVE EXAMPLES

Comparative Example 1

A zirconium catalyst was tested in a slurry reactor at 85° C. with 130 psi ethylene partial pressure. A hexene/ethylene gas ratio of 0.03 was used. MAO/toluene solution (12 wt % 2 ml) was added to the reactor. Productivity of 800 g resin/g catalyst/hr was measured.

The same catalyst system was tested in the fluid bed reactor at 90° C. with 200 psi ethylene partial pressure. A 0.025 hexene to ethylene gas ratio was used. A feed rate of 150 to 200 cc/hr of 2 wt % MAO/toluene solution was employed. The MAO solution was added below the distributor plate. Even at very high MAO/toluene feed rates, catalyst productivity was only 220 g resin/g catalyst/hr. In addition, the reactor had to be shut down due to a fouled plate only 18 hours after the MAO feed was started.

This example illustrates that it is more effective to activate zirconium catalysts prior to introduction into a gas phase reactor. It also illustrates the fouling problems experienced when MAO solutions are added to the gas-phase reactor.

Comparative Example 2

A titanium/zirconium mixed metal catalyst was tested in the fluid bed reactor. At 150 psi ethylene partial pressure at 90° C. a 0.04 hexene to ethylene gas ratio was employed, and a hydrogen to ethylene gas ratio was 0.045. A 2 wt % solution of MAO in toluene was added beneath the fluid bed distributor plate. Resin flow index and GPC curve analysis showed that the zirconium catalyst sites were active, and the Ti:Zr productivity ratio was 7:3. However, the reactor had to be shut down within 24 hours because the distributor plate had fouled.

Comparative Example 3

The same titanium/zirconium catalyst used in Example 2 was tested in the fluid bed reactor. It was run at 90° C. with 150 psi ethylene partial pressure. A 0.03 hexene to ethylene gas ratio was used and a hydrogen to ethylene ratio was 0.04. A solution of 2 wt % MAO in toluene was added directly into the bed at the rate of 200 cc/hr. The resin flow index and molecular weight distribution showed definitively that the zirconium sites were active with a Ti:Zr productivity ratio of 3:7. In the process of running this test, though, a very large chunk grew around the injection port causing a shutdown.

This example demonstrates that relative zirconocene catalyst activity is significantly higher when there is better contact between the MAO/toluene droplets and the catalyst sites It also verifies that fouling also occurs when the MAO solution is added to the reactor directly into the fluid-bed of polymer.

Comparative Example 4

The catalyst used in examples 2 and 3 was re-run under the same conditions used in example 3. The MAO feed rate was the same as well. During this test, though, the MAO was dispersed into a 10 lb/hr ethylene gas stream using an ultrasonic atomizer. The atomizer dispersed the MAO solution into very small (40 micron) droplets.

Enough gas was used so that the toluene evaporated from the MAO. The gas flow rate was determined in an off-line test using toluene alone. The resin produced during this test showed no evidence of activity from the zirconium sites. In addition, there were no signs of reactor fouling after an extended period of running.

This example proves that it is the presence of liquid in the reactor that is responsible both for the activation of the zirconium and the fouling of the reactor.

Thus it is apparent that there has been provided, in accordance with the invention, a process that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed:

1. In a fluidized bed gas phase polymerization process for producing resins comprising at least one olefin selected from the group consisting of ethylene and a $C_3$–$C_{10}$ alpha olefin, under polymerization conditions effective to form said resins comprising a pressure ranging from 100 to 350 psi, at a temperature ranging from 30° to 115° C., in the presence of a catalyst composition effective to produce said resins, the improvement comprising introducing to the reactor said catalyst composition, wherein the catalyst composition comprises a metallocene and an aluminoxane, wherein the aluminoxane is supported on a carrier material, by a process comprising (1) providing silica which is porous and has a particle size of 1 to 250 microns, having pores which have an average diameter of 50 to 500 Angstroms and having a pore volume of 0.5 to 5.0 cc/g;

(2) providing a solution comprising alumoxane of formula (a) or (b) wherein (a) is R-(Al(R)-O)$_x$-AlR$_2$ for oligomeric, linear alumoxanes and (b) is (-Al(R)-O-)$_y$ for oligomeric cyclic alumoxane wherein x is 1–40, y is 3–40, and R is a $C_1$–$C_8$ alkyl group and a solvent for said alumoxane
wherein the alumoxane provides aluminum in an amount sufficient to provide a weight ratio of Al to silica from 0.10 to 0.40;

(3) contacting the silica with said solution and allowing the solution to impregnate the pores of silica, having a pore volume of 0.5 to 5.0 cc/g, containing alumoxane within said pores, without forming a slurry of the silica in the solvent, wherein the volume of solution ranges from less than the pore volume of the silica up to a maximum volume of solution which is equal to the total pore volume of the silica, wherein the concentration of alumoxane, expressed as Al weight percent is 5 to 20;

(4) after said contacting, recovering dry particles of said contacted silica.

2. The process of claim 1, wherein the alumoxane is methylalumoxane.

3. The process of claim 2, which further comprises adding, to said solution at least one metallocene compound of the formula: $Cp_mMA_nB_p$ wherein Cp is a cyclopentadienyl or a substituted cyclopentadienyl group;

m is 1 or 2;

M is zirconium or hafnium; and each of A and B is selected from the group consisting of a halogen atom, a hydrogen atom and an alkyl group, providing that m+n+p is equal to the valence of the metal M; wherein the metallocene compound is admixed with an amount of a alumoxane effective to activate the metallocene compound to form a catalyst.

4. The process of claim 3, wherein the metallocene compound is selected from the group consisting of bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1$-$C_6$ alkyls.

5. The process of claim 4, wherein the metallocene compound is selected from the group consisting of bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)zirconium dichloride, cyclopentadienylzirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl)]zirconium dichloride.

6. The process of claim 5, wherein solution has a composition which provides a molar ratio of alumoxane, expressed as aluminum, to metallocene ranging from 50 to 500.

7. The process of claim 1, wherein the silica contains reactive hydroxyl groups (OH), in an amount ranging from 0.1 to 3.0 mmols/g carrier, and wherein the reactive hydroxyl groups are reacted, prior to said contacting of (3), with an organomagnesium compound, so that the Mg:OH molar ratio ranges from 0.9:1 to 4:1 wherein the organomagnesium compound has the formula $R_qMgR'_R$ where R and R' are the same or different $C_2$-$C_8$ alkyl groups, and 8 and R are each 0, 1 or 2, providing that 8+R is equal to the valence of Mg.

8. The process of claim 7, wherein both R and R' are n-butyl groups.

9. The process of claim 1, which further comprises heating the dry particles to remove solvent from the pores, under temperature conditions effective to prevent crosslinking of the alumoxane.

10. The process of claim 3, wherein the temperature of heating ranges from above 30° and below about 60° C.

11. The process of claim 7, which further comprises introducing a monomeric trialkylaluminum, free of oligomeric or polymeric reaction product of trialkylaluminum and water.

12. The process of claim 11, wherein after the silica is reacted with said organomagnesium, the silica is impregnated with titanium tetrachloride.

13. The process of claim 11, wherein after the silica is reacted with said organomagnesium, the silica is impregnated with a non-metallocene transition metal.

14. The process of claim 1, wherein the metallocene comprises a substituted cyclopentadienyl group.

15. The process of claim 13, wherein the metallocene comprises a substituted cyclopentadienyl group.

16. The process of claim 1, wherein catalyst composition is fed to the polymerization in the absence of a solution of alumoxane.

17. The process of claim 11, wherein catalyst composition is fed to the polymerization in the absence of a solution of alumoxane.

\* \* \* \* \*